June 30, 1970  MIYAJI TOMOTA ETAL  3,518,696
BIOLOGICAL ELECTRICAL PHENOMENON RECORDING INSTRUMENT
Filed Sept. 24, 1968  3 Sheets-Sheet 1
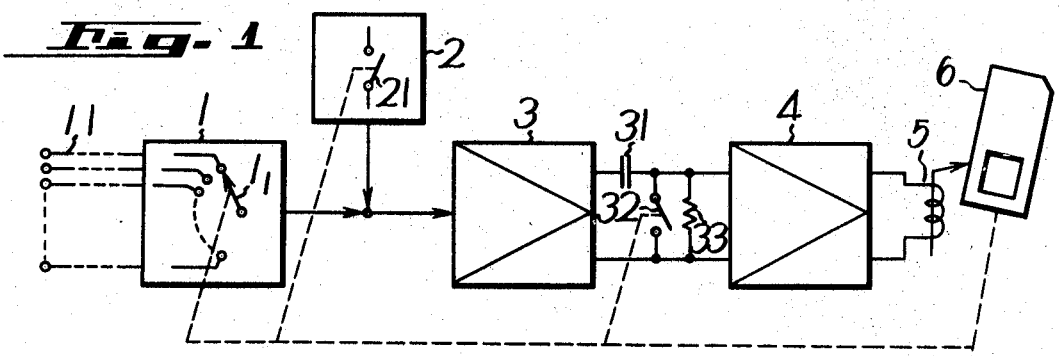
Fig. 1
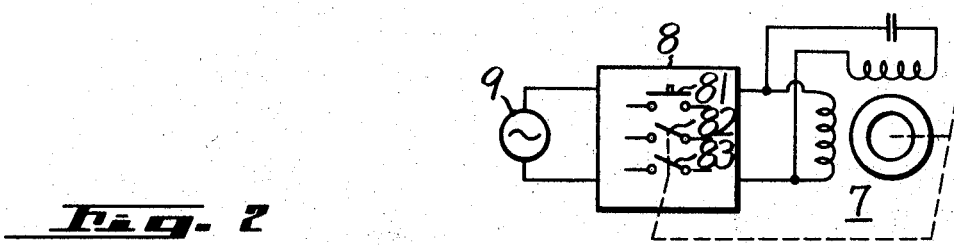
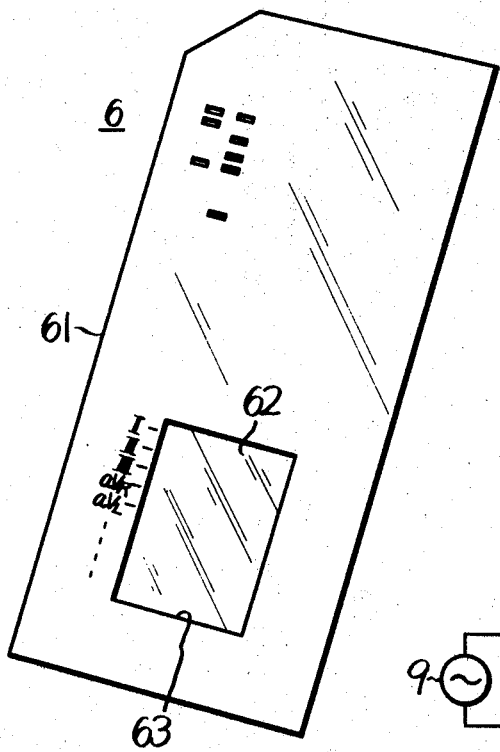
Fig. 2
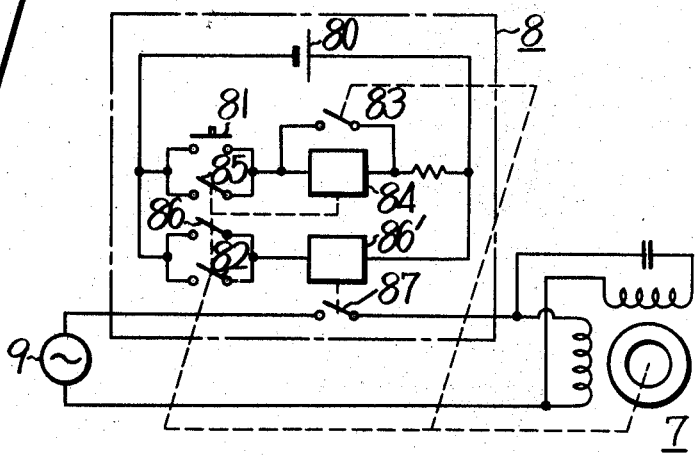
Fig. 3
Fig. 4
INVENTOR.
Miyaji Tomota, Mitsutoshi Mori,
Kenichi Tokunaga, Eisuke Etoh
& Eisuke Abe
BY
ATTORNEYS

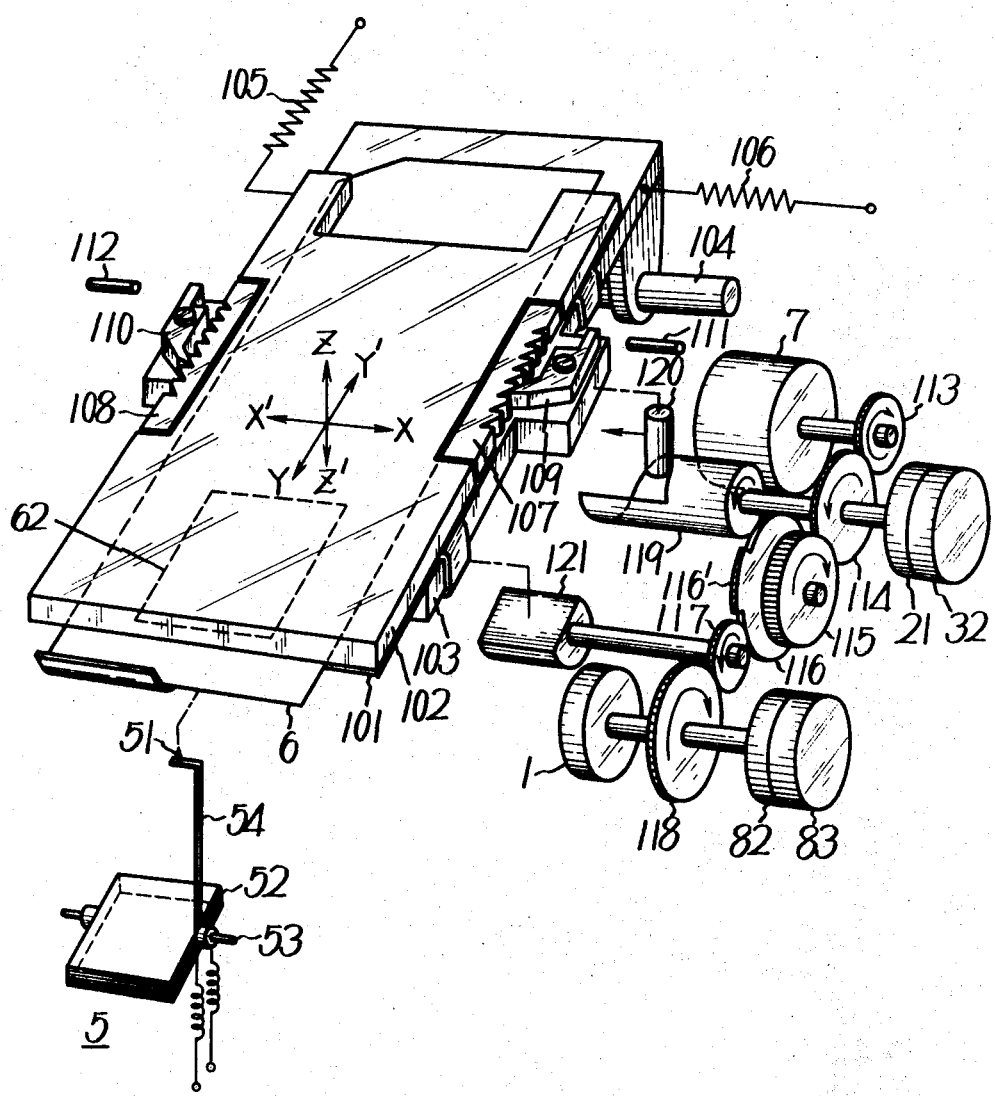

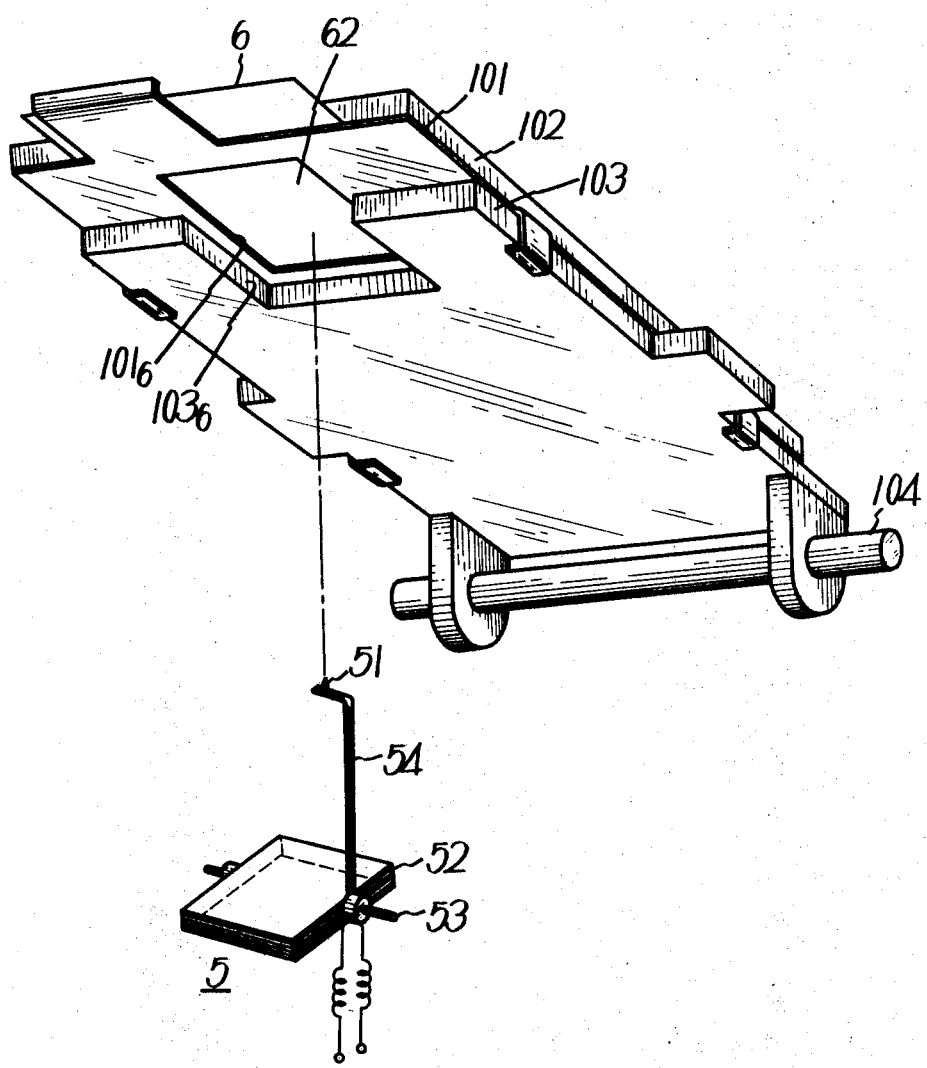

United States Patent Office

3,518,696
Patented June 30, 1970

3,518,696
BIOLOGICAL ELECTRICAL PHENOMENON RECORDING INSTRUMENT
Miyaji Tomota, Mitsutoshi Mori, Kenichi Tokunaga, Eisuke Etoh, and Eisuke Abe, Tokyo, Japan, assignors to Kabushikikaisha Yokogawa Denki Seisakusho (Yokogawa Electric Works, Ltd.), Tokyo, Japan, a corporation of Japan
Filed Sept. 24, 1968, Ser. No. 761,917
Claims priority, application Japan, Sept. 30, 1967, 42/62,920
Int. Cl. G01d 9/38; A61b 5/04
U.S. Cl. 346—23     6 Claims

ABSTRACT OF THE DISCLOSURE

A biological electrical phenomenon recording instrument having a recording member consisting of an information recording film and an information part supporting the film and capable of being mechanically decoded, recording pen means, means for supplying the pen means with information to be recorded on the film, and means for moving the recording member relative to the pen means.

BACKGROUND OF THE INVENTION

Field of the invention

This invention relates to an instrument for recording biological electrical phenomena, and more particularly to an automatic biological electrical phenomena recording instrument adapted for micronized recording of the biological electrical phenomena.

Description of the prior art

For measuring biological electrical phenomena as in the case of recording an electrocardiogram, there are various lead methods such as standard limb leads, augmented unipolar leads, zeropotential unipolar leads and so on, and the recording of the electrocardiogram is achieved through the use of some or all of these methods.

In these lead methods, for example, the standard limb leads and the augmented unipolar leads may be accomplished in three ways and the zeropotential unipolar leads in six ways. The changeover of the leads is carried out by changing the combination of measuring cords connected to respective parts of the human body. In the past the changeover was effected manually.

With the prior art, the electrocardiograms are recorded on long, narrow recording papers and are appreciably long and bulky after the electrocardiograms have been recorded thereon in accordance with the respective methods, so that the recorded electrocardiograms occupy a good deal of space and subsequent filing of each cardiogram requires elaborate task and its retrieval is difficult to do.

SUMMARY OF THE INVENTION

This invention is to eliminate such drawbacks encountered in the prior art as mentioned above and has for its object the provision of a biological electrical phenomenon recording instrument which employs as a recording member an aperture card having mounted thereon a recording film, which card can be mechanically processed like a punch card, and which is adapted such that a biological electrical phenomenon diagram such as an electrocardiogram is automatically recorded on the recording film on the card in micronized form by scratching of a recording pen on the film.

One object of this invention is to provide a biological electrical phenomena recording instrument such as an electrocardiograph in which the combination of measuring cords is automatically changed over to sequentially record biological electrical phenomena such as electrocardiograms in an automatic manner in accordance with a desired method of leads.

Another object of this invention is to provide a biological electrical phenomena recording instrument which employs as a recording member a card having mounted thereon a recording film, which card can be mechanically processed just like a punch card, and which is adapted such that micronized recordings such as electrocardiograms are effected on the recording film of the card by scratching of a recording pen to provide convenience for the custody of the recorded diagrams such as the electrocardiograms and enables their subsequent retrieval or arrangement to be mechanically achieved.

Still another object of this invention is to provide a recording instrument, each recorded datum obtained by which facilitates making of enlarged copies of any desired one of recorded data.

Another object of this invention is ot provide an automatic biological electrical phenomena recording instrument which makes feasible mass medical examination at a large hospital or in a big institution by making the most of its advantages of automatic operation, punch card and microfilming.

Other objects, features and advantages of this invention will become apparent from the following description taken in conjunction with the accompanying drawings.

BRIEF DESCRIPTION OF THE DRAWING

FIG. 1 is a block diagram illustrating the electrical construction of one example of an instrument produced according to this invention;

FIG. 2 is a plan view of a recording member used in the instrument depicted in FIG. 1;

FIG. 3 is a cross-sectional view of a recording film of the recording member shown in FIG. 2, illustrating the condition in the recording on the recording film;

FIG. 4 is an electrical connection diagram of a control circuit of a motor employed in the instrument of FIG. 1;

FIG. 5 is a schematic diagram for explaining the construction of a recording member feeding mechanism used in the instrument of FIG. 1; and FIG. 6 is a schematic diagram showing the relationship between the recording member and a recording pen in the recording member feeding mechanism of FIG. 5.

DESCRIPTION OF THE PREFERRED EMBODIMENTS

With reference to the drawings the present invention will hereinafter be described in detail. In FIG. 1 illustrating in block the electrical construction of one example of a recording instrument of this invention, refernce numeral 1 indicates a lead selector, which is designed such that the combination of measuring cords 11 connected to different parts of the human body may be selectively changed to connect an electrocardiogram to a desired lead. The changeover of the lead selector 1 is automatically carried out by a motor 7 in relation to the feeding of a recording card 6, as will be described later. Reference numeral 2 designates a calibrating signal generator circuit, by which a reference signal for reading an electrocardiogram is recorded for each start of recording of the electrocardiogram at every lead. The generation of the calibrated signal is achieved by make and break of a switch 21 associated with the feeding of the recording card 6 as will be described later. Reference numeral 3 identifies a pre-amplifier and 4 a main amplifier, and a coupling capacitor 31. A short-circuit switch 32 and a parallel resistor 33 are provided between the pre-amplifier 3 and the main amplifier 4. The short-circuit switch 32 is actuated in ganged relation with the feeding of the recording card 6 in such a manner as will be described later. Reference numeral 5 indicates a recording element, which is driven by the output of the main amplifier 4 to record an electrocardiogram on the recording card 6.

The recording card 6 consists of a ground paper 61 which has information in the form of, for example, punched holes 64 capable of being mechanically decoded and hence can be mechanically processed like a punched card and has formed therethrough an elongated aperture or window 63 into which a recording film 62 is fitted, as exemplified in FIG. 2.

The recording film 62 consists of a transparent base 621 such, for example, as a polyester film and an opaque coating 622 such as carbon coating laid on the base 621, and the recording of the electrocardiogram on the film 62 is achieved by selective removal of the opaque coating 622 by means of a recording pen 51.

The recording pen tip 51 is made of a very hard material such, for example, as diamond and has a very fine point, so that scratched lines by the pen 51 can be made as fine as about ten microns in width to permit recording of a micronized electrocardiogram on the recording film 62.

In the present invention electrocardiograms in accordance with different leads are separately recorded on the recording film 62 in different lines.

In FIG. 2 reference numerals and characters I, II, III, $aV_R$, $aV_L$ . . . , marked on the ground paper 61 along one side of the film 62 indicate the sections in which the electrocardiograms are respectively recorded in accordance with the lead methods employed.

Turning back to FIG. 1, reference numeral 8 designates a relay circuit for controlling the motor 7 feeding the recording card 6 and 9, a power source for the motor 7.

Referring now to FIG. 4, a detailed description will be given of the relay circuit 8. In the figure reference numeral 80 indicates a power source for energizing the relay, 81 a manual push-button switch, 82 and 83 switches actuated by the motor 7 to make and break, 84 a relay, and 85 and 86 contacts actuated by the relay 84 to make and break. Further, reference numeral 86 designates another relay, which acuates a contact 87 to make and break to connect the motor 7 and the power source 9 intermittently.

The operation of the relay circuit 8 is achieved in the following manner. Namely, upon pushing the push-button switch 81, a current flows from the power source 80 to the relay 84 to energize it, thereby closing its normally open contacts 85 and 86. The closing of the contact 85 causes a current to be applied therethrough to the relay 84, so that even if the push-button switch 81 is released, the relay 84 remains self-maintaining. While, the closing of the contact 86 causes a current to be applied therethrough from the power source 80 to the relay 86' to energize it, by which the contact 87 is closed to connect the power source 9 to the motor 7 to drive it. The revolution of the motor 7 is transmitted to the switches 82 and 83 through a reduction gear such as examplified in FIG. 5, and these switches 82 and 83 are adapted to be automatically closed when the total revolution number of the motor 7 has reached a value at which the entire process of the feeding of the recording card 6 is terminated. In such a case, firstly the switch 82 is closed and secondly the switch 83 is closed and is immediately opened and then the switch 82 is opened. That is, the switch 82 is closed to hold the relay 86' in the on state to maintain the revolution of the motor 7 and then the switch 83 is closed by making use of the continued revolution of the motor 7 to short-circuit the relay 84 to release it and hence open the contacts 85 and 86, after which the switch 82 is opened to release the relay 86' and hence open the contact 87, thereby automatically stopping the revolution of the motor 7. Thus, with the provision of the relay circuit 8, once the motor 7 has been started by the push-button switch 81, the motor 7 is driven by the power source 9 until the completion of the entire feeding process of the recording card 6 and is automatically stopped upon the completion of the feeding.

The mechanism for feeding the recording card 6 by the motor 7 is as illustrated in FIG. 5. In the figure reference numeal 101 indicates a mounting plate for the recording card 6, 102 a transparent card keep plate formed of, for example, glass, plastic or the like and 103 a moving mount to which the mounting plate 101 is mechanically fixed. The moving mount 103 is loosely mounted on a shaft 104 supported to the stationary part and is adapted to be movable in a direction X–X' in the figure. The card mounting plate 101 is mounted on the moving mount 103 in a manner to be movable in a direction Y–Y' and the recording card 6 is inserted between the card mounting plate 101 and the card keep plate 102. Reference numerals 105 and 106 designate return springs which are respectively stretched between the card mounting plate 101, the moving mount 103 and the stationary part. Reference numerals 107 and 108 indicate racks having teeth formed on the outside thereof and fixed to the card mounting plate 101 at either side thereof in the direction Y–Y'. Reference numerals 109 and 110 identify ratchets which are pivotally mounted on the moving mount 103 facing the racks 107 and 108 and are respectively meshed with the teeth of the racks 107 and 108 by spring force, though not shown, so as to prevent excessive backward movement of the card mounting plate 101 due to the force of the return spring 105. The meshing relation of the racks with the ratchets is such that when the rack and ratchet of one side are meshed with each other those of the other side are in half-meshed condition. Reference numerals 111 and 112 designate fixed pins planted on the stationary part. As the moving mount 103 reciprocates on the shaft 104 in the direction X–X', the free end portions of the clicks 109 and 110 pivotally mounted on the moving mount 103 respectively collide against the pins 111 and 112 to disengage the clicks from the racks at every collision to permit the card mounting plate 101 to be pulled back step by step to the side Y' in the direction Y–Y' by the force of the return spring 105. Reference numerals 113 to 118 designate gears of a gear train for transmitting the revolution of the motor 7. Namely, the gear 113 is affixed to the rotary shaft of the motor 7 and is meshed with the gear 114, which is, in turn meshed with the gear 115. The gear 116 is a sector gear which is coaxial with the gear 115, and teeth 116' of the gear 116 mesh with the gear 117. Only when the gear 117 meshes with the gear 116 the revolution of the motor 7 is transmitted to the gear 117. The teeth 116' of the gear 116 are formed in a manner to rotate the gear 117 once. Reference numeral 119 identifies a cam shaft which is affixed to the same shaft as the gear 114. As the cam shaft 119 rotates, it pushes down a pin 120 attached to the underside of the moving mount 103 to move the moving mount 103 to the side X' in the direction X–X' against the recovery force of the return spring 106. When the cam shaft 119 has rotated once and the pin 120 has passed the top end of the cam shaft 119, the moving mount 103 is rapidly returned to the side X in the direction X–X' automatically by the force of the return spring 106. In this manner, the moving mount 103 is reciprocated once in the direction X–X' by one rotation of the cam shaft 119. Reference numeral 121 indicates a cam contacting the underside of the moving mount 103, which cam is mounted on the same shaft as the gear 117 driven by the sector gear 116 and in intermittently rotated once in synchronism with one rotation of the sector gear 116, that is, the cam 121 causing the moving mount 103 to effect one reciprocating upward and downward movement in the direction Z–Z'. The switches 21 and 32 are mounted on the shaft of the cam shaft 119, that is, on the same shaft as the gear 114 and are opened and closed in synchronism with one rotation of the cam shaft 119. The lead selector 1 and the switches 82 and 83 are mounted on the same shaft as the gear 118, so that every rotation of the cam 121 is transmitted through the gear 118 meshed with the gear 117 to the lead selector 1 and the switches 82 and 83 to rotate them through a certain angle step by step. At every step of the rotation the lead selector 1 changes over the contacts for selecting the leads.

The recording element 5 is provided with a usual moving coil type pen motor. This is not directly related to the gist of this invention, and hence is partly omitted in FIGS. 5 and 6 for the sake of brevity. The recording pen 51 is mounted on the free end of an arm 54 fixed to a rotary shaft 53 of a moving coil 52 supplied with an output signal from the main amplifier 4 in such a manner that the pen 51 may make contact with the recording film of the recording card 6 from behind the moving mount 103, as illustrated in FIG. 6. Further, the card mounting plate 101 has formed therein at a place corresponding to the recording film 62 of the recording card 6 a window $101_6$ of the same size as the recording film 62, and a recess $103_6$ is formed in the moving mount 103 at a place corresponding to the recording film 62.

A description will hereinbelow be given of the operation of the instrument constructed as above described. Before recording, the moving mount 103 is pulled by the return spring 106 to the outermost (right end) position in the direction X–X' and is held there. Under such conditions, the card counting plate 101 with the recording card 6 mounted thereon is pulled to the side Y in the direction Y–Y' to mesh the farthest tooth on the side Y' of the rack 108 with the ratchet 110 to set the recording card 6 at a recording start position. In such a case, the recording pen 51 faces the recording film 62 at the left upper portion. A moving contact of the lead selector 1 is initially held in a condition for the first lead of the standard limb leads. Pushing the push-button switch 81, the motor 7 starts to revolve, as described above. The revolution of the motor 7 causes the rotation of the cam 121 so as to bring down the moving mount 103, thus making the recording film 62 held thereupon engage with the pen 51 to be ready to start recording. The gear 113 affixed to the rotary shaft of the motor drives the gear 114 and hence rotates the cam shaft 119 fixed at one end of the rotary shaft of the gear 114, with the result that the pin 120 mounted on the moving mount 103 is correspondingly moved in the direction of the shaft 104, that is, to the side X' in the direction X–X'. Consequently, the moving mount 103 having fixed thereto the pin 120 is moved to the side X' in the direction X–X', so that the recording card 6 on the moving mount 103 is also transported to the same side in the same direction and thus the recording of the first line is carried out on the recording film 62 from its left upper portion (on the sides of X' and Y') to the edge of the film 62 on the side of X in the direction X–X' by the recording pen 51 contacting the back of the recording film 62 of the recording card 6. The switch 21 mounted on the shaft of the gear 114 is adapted such that it rotates with the revolution of the motor 7 and shortly closes for a certain period of time and opens to thereby generate a calibrating signal from the calibrating signal generator 2. The calibrating signal is fed through the amplifier circuits to the recording element 5 and is recorded on the recording film 62 at the recording start position prior to recording of an electrocardiogram. The lead selector 1 and the switch 21 are associated with the motor 7 through the gears in such a manner that after the recording of the calibrating signal on the recording film 62 the recording of the electrocardiogram is initiated and that the electrocardiogram is recorded on the recording film 62 in accordance with the feeding of the moving mount 103. When the recording of the first line is continued and the feeding of the moving mount 103 to the side X' draws to a close, the teeth 116' of the sector gear 116 coaxial with the gear 115 meshing with the gear 114 meshes with the gear 117, so that the cam 121 mounted on the shaft of the gear 117 also starts to rotate with the gear 117. Upon completion of the recording, the moving mount 103 is pushed up by the cam 121 to the side Z in the direction Z–Z', as described above, to disengage the recording film 62 of the recording card 6 from the recording pen 51. At this time, the moving mount 103 is continuously transported to the side X' (to left) by the cam shaft 119 and shortly the free end of the ratchet 110 meshing with the rack 108 hits against the fixed pin 112 to disengage the ratchet 110 from the rack 108. As a result of this, the card mounting plate 101 on the moving mount 103 is pulled back to the side Y' in the direction Y–Y' by the return spring 105. At this time, the ratchet 109 in half-meshed relation to the rack 107 is caused to be completely meshed with the rack 107, by which the backward movement of the card mounting plate 101 is limited to a distance corresponding to the half of the tooth pitch of the rack 107. The moving mount 103 continues to be transported to the side X' and when the pin 120 pushed by the cam shaft 119 has run past the top end of the cam shaft 119, the pin 120 disengages from the cam shaft 119, so that the moving mount 103 is rapidly returned to the side X automatically by the recovery force of the return spring 106. Upon initiation of the returning of the moving mount 103, the ratchet 110 disengages from the pin 112, and consequently the ratchet 110 comes into contact with the rack 108 in a half-meshed condition. When the moving mount 103 has returned to its initial position on the side X, the free end of the ratchet 109 runs against the fixed pin 111 to disengage the ratchet 109 from the rack 107. Then, the card mounting plate 101 is moved by the force of the return spring 105 a half pitch to the side Y' until the ratchet 110 half-meshed with the tooth of the rack 108 is brought into a completely meshed condition. Namely, the card mounting plate 101 is transported to the side Y' one pitch including the previous half pitch. As a result, the recording start position of the second line on the recording film 62 is brought to the position above the recording pen 51. At this time, the rotation of the cam 121 is terminated to bring down the moving mount 103 to engage the recording film 62 of the recording card 6 with the recording pen 51, and then recording on the second line is initiated. The lead selector 1 is fixedly mounted on the shaft of the gear 118 meshing with the gear 117 in such a manner that while the moving mount 103 is caused by the cam 121 to move up and down in the direction Z–Z', the contacts of the lead selector 1 are selectively changed over to effect the second lead of the standard limb leads. That is, the combination of the measuring cords 11 is achieved so that a moving contact $1_1$ of the lead selector 1 effects the second lead. Further, the switch 32 mounted on the cam shaft 119 closes upon completion of the recording on the first line and remains closed until immediately before the start of the recording on the second line to short-circuit an input circuit of the main amplifier 4, ensuring that undesirable noise resulting from the changeover of the lead selector 1 is not recorded on the recording film 62.

Thus, the above-described operations are repeatedly carried out to automatically effect sequential recording of electrocardiograms on different lines according to the respective lead methods. Namely, the recording of the cardiograms are achieved by the feeding of the recording card 6 which consists of the reciprocating motion of the moving mount 103, its vertical motion associated with the reciprocating motion and the stepwise movement of the card mounting plate 101 and by the operations of the switches and the lead selector 1 in ganged relation to the feeding of the recording card 6. When the total number of revolutions of the motor 7 has come close to a value at which to stop the entire feeding process of the recording card 6 and all the electrocardiograms of the respective lead methods have been recorded, the power source of the motor 7 is automatically cut off to stop the motor 7 by the operation of the switches 82 and 83 related to the revolution of the motor 7, that is, mounted on the shaft of the gear 118 as described above, thereby stopping the entire operation of the instrument.

With the present invention, the recording card 6 after recorded can be put in the custody after entering the operator's view and data at predetermined area on the ground paper 61 of the recording card 6, so that the recording card of this invention is very convenient for arrangement. Further, since the electrocardiograms of the respective lead methods are all recorded in micronized form on the recording film 62 of one recording card 6, the custody of the recorded results does not occupy a good deal of space. In addition, a card such as a punch card capable of being mechanically processed can be used as the ground paper 61 of the recording card 6, and hence sorting and retrieval of the recording card can be mechanically achieved. Further, since the electrocardiograms are recorded in the form of transparent loci on the opaque film, they can readily be observed in magnified form by optical means and can be copied.

Although the present invention has been described as applied to the recording of the electrocardiogram, it is to be understood that the invention is applicable to the recording of other biological electrical phenomena diagrams such as an electroencephalogram and so on to obtain the same results.

It will be apparent that many modifications and variations may be effected without departing from the scope of the novel concepts of this invention.

We claim as our invention:

1. A biological electrical phenomenon recording instrument comprising a recording member having an information recording film and an information portion supporting the information recording film and capable of being mechanically decoded, recording pen means, supplying means for supplying a plurality of channels of information to the recording pen means to be recorded on the information recording film, said supplying means including means for sequentially selecting said plurality of channels of information, means for moving the recording member with respect to the recording pen means in a reciprocal motion and in a stepwise manner at substantially right angles to the direction of said reciprocal motion, and a motor means driving said means for moving said recording member and for driving said means for sequentially selecting said plurality of channels of information in such a manner that when the recording of one of said plurality of channels of information is terminated said recording member is automatically brought to its initial position with respect to the direction of the reciprocal motion and is automatically brought to the next step and said selecting means selects automatically the next channel of information.

2. A biological electrical phenomenon recording instrument as claimed in claim 1 wherein the information recording film consists of a base formed of a transparent material and an opaque material coating laid on the transparent base.

3. A biological electrical phenomenon recording instrument as claimed in claim 2 wherein the opaque coating of the recording film is selectively removed by scratching it with the recording pen to record the information.

4. A biological electrical phenomenon recording instrument as claimed in claim 1 wherein the recording member moving means consists of a mounting plate for mounting thereon the recording member, a moving mount for supporting the mounting plate, means for reciprocating the moving mount, and means for shifting the recording member mounting plate in a stepwise manner in a direction substantially at right angles to the direction of the reciprocating motion of the moving mount.

5. A biological electrical phenomenon recording instrument as claimed in claim 1 wherein means is provided for generating a calibrating signal and the calibrating signal is applied to the recording pen to be recorded on the information recording film prior to the recording of the information.

6. A biological electrical phenomenon recording instrument as claimed in claim 1 wherein calibrating signal generating means is provided; a plurality of switch means are provided in ganged relation to the recording member moving means; the different information is changed over in relation to the stepwise shifting means of the recording member moving means and is applied to the recording pen; a circuit for supplying the information to the recording pen being cut off during the changeover operation of the information; and the calibrating signal from the calibrating signal generator is recorded prior to the recording of the information, the operation of the instrument being automatically stopped upon completion of all the information.

References Cited

UNITED STATES PATENTS

| 2,718,224 | 9/1955 | Apstein | 128—2.06 |
| 3,374,485 | 3/1968 | Gemmer | 346—23 |
| 3,377,111 | 4/1968 | Brault | 308—3 |

OTHER REFERENCES

Zitnik et al.; Design of a Centralized Electrocardiographic and Vector Cardiographic System; The American Journal of Cardiology; vol. 19; June 1967; pp. 818–826.

JOSEPH W. HARTARY, Primary Examiner

U.S. Cl. X.R.

128—2.06; 346—34, 77, 134